(12) United States Patent
Southwell et al.

(10) Patent No.: US 7,216,342 B2
(45) Date of Patent: May 8, 2007

(54) CODE GENERATION

(75) Inventors: Trefor Southwell, Bristol (GB); Peter Hedinger, Bristol (GB)

(73) Assignee: STMicroelectronics Limited, Bristol (GB)

( * ) Notice: Subject to any disclaimer, the term of this patent is extended or adjusted under 35 U.S.C. 154(b) by 674 days.

(21) Appl. No.: 10/099,455

(22) Filed: Mar. 14, 2002

(65) Prior Publication Data
US 2003/0177483 A1 Sep. 18, 2003

(51) Int. Cl.
*G06F 9/44* (2006.01)

(52) U.S. Cl. .................................. 717/162; 717/127
(58) Field of Classification Search ........ 717/140–167, 717/127–129; 712/233
See application file for complete search history.

(56) References Cited

U.S. PATENT DOCUMENTS

| 5,274,811 | A | * | 12/1993 | Borg et al. ................. 717/128 |
| 6,129,458 | A | * | 10/2000 | Waters et al. ............... 711/133 |
| 6,141,732 | A | * | 10/2000 | Adams ....................... 711/137 |
| 2002/0019969 | A1 | * | 2/2002 | Hellerstrand | |
| 2003/0033480 | A1 | * | 2/2003 | Jeremiassen | |

* cited by examiner

*Primary Examiner*—Tuan Dam
*Assistant Examiner*—Chuck Kendall
(74) *Attorney, Agent, or Firm*—Lisa K. Jorgenson; Robert Iannucci; Seed IP Law Group PLLC

(57) ABSTRACT

A method of linking a plurality of object files to generate an executable program, the method comprises identifying in the object files at least one routine to be locked into a cache when the program is executed, locating said routine at a set of memory addresses which man onto a set of cache locations and introducing into the executable program gaps at other sets of memory addresses which map onto the same set of cache locations.

14 Claims, 4 Drawing Sheets

CODE GENERATION

FIELD OF THE INVENTION

The present invention relates to the generation of code and particularly to the generation of code to be executed in a processor including a cache.

BACKGROUND OF THE INVENTION

In the field of computer systems, cache memories and their use are well known. However, a brief discussion follows in so far as is necessary to fully understand this invention.

Caches are high-cost, high-speed memories that provide an important performance optimisation in processors. This is done by keeping copies of the contents of most commonly used locations of main memory near to the processor, namely in cache locations. As a result, accesses to the contents of these memory locations are much quicker.

The instruction cache is responsible for optimising accesses to the program being executed. The cache will usually be smaller than the size of the program, meaning that the contents of the cache will need to change to ensure that the parts of the program currently being executed are in the cache.

In designing the instruction cache a trade-off between cost and performance has to be made. Two of the key parameters that can be changed are the cache's size and associativity. These both influence the resulting silicon area and maximum clock frequency of the cache.

The size of a cache is determined by a number of factors, but will depend primarily on area limitations and target applications of the design.

Determining the appropriate level of associativity of the cache can be harder.

For a direct-mapped cache, each block in main memory maps to a unique location (line) in the cache, That is a "block" in memory is a chunk of data corresponding in size to a cache location. If two blocks map to the same line then they cannot be in the cache at the same time and will continually replace each other. This case is referred to as a conflict.

For a set-associative cache, each block maps to a set of lines. The block can be stored in any of the lines in the set. Note that because the number of lines in the cache is constant, dividing the cache into sets means that more blocks map to each set. In general, the cache will be more effective with a reasonable level of associativity because it can decide which lines it will replace and which lines will be kept.

However, there are at least two reasons why a direct-mapped cache may be chosen, namely higher potential clock frequency and smaller area than a set-associative cache of the same size.

One of the disadvantages of a direct-mapped instruction cache manifests itself in relation to functions which desirably should be locked into a cache. There are a number of cases where it is desirable to lock a function into the cache. For example, an interrupt handler routine may have to guarantee a maximum latency for treating the interrupt. This may only be possible if the code is locked into the cache. However, in a direct-mapped cache, each memory block maps to a single entry in the cache, For this reason it is not common to provide cache locking with a direct-mapped cache. That is, if an area of memory were locked into the cache, then any other code that maps to the same position would have to be executed uncached. In some cases, executing code uncached may not be supported, and therefore locking a part of the cache would prevent normal programs from being executed.

Thus, in general, cache locking is provided only with set associative caches which do not have the same limitation on mapping of code into the cache.

It is an aim of the present invention to allow cache locking to be implemented with a direct-mapped cache without need for additional hardware.

According to one aspect of the invention there is provided a method of linking a plurality of object files to generate an executable program, the method comprising: identifying in the object files at least one routine to be locked into a cache when the program is executed; locating said routine at a set of memory addresses which map onto a set of cache locations; introducing into the executable program gaps at other sets of memory addresses which map onto the same set of cache locations.

Another aspect of the invention provides a linker for linking a plurality of object files to generate an executable program, the linker comprising: means for identifying in the object files at least one routine to be locked into a cache when the program is executed; means for locating said routine at a set of memory addresses which map onto a set of cache locations: and means for introducing into the executable program gaps at other sets of memory addresses which map onto the same set of cache locations.

A further aspect of the invention provides a computer program product comprising program code means in the form of an executable program containing a plurality of routines, wherein at least one of said routines is located at a set of memory addresses which map onto a set of cache locations and wherein at other sets of memory addresses which map onto the same set of cache locations the executable program contains gaps, whereby when the computer program product is loaded into a computer and executed, said at least one routine is locked into the cache.

For a better understanding of the present invention and to show how the same may be carried into effect, reference will now be made by way of example to the accompanying drawings.

DESCRIPTION OF THE PREFERRED EMBODIMENT

Figure 1:
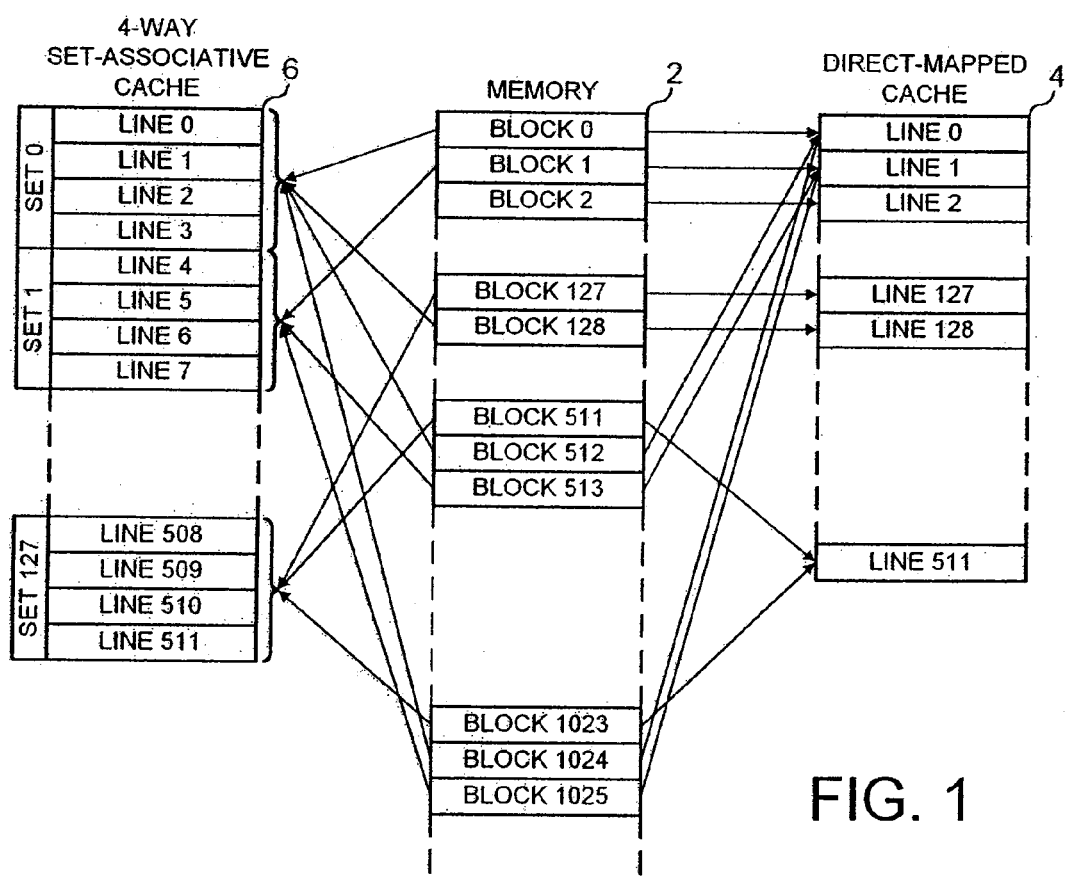
FIG. 1 is a schematic diagram illustrating mapping between a memory and a direct-mapped cache and a four way set associative cache.

FIG. 1 illustrates the relationship between memory locations and cache lines in a four way set associative cache and a direct-mapped cache. The main memory is denoted by reference numeral 2 shown to have a plurality of program blocks. A direct-mapped cache is denoted by reference numeral 4 and is shown with a plurality of numbered cache lines. Each block maps onto a single cache line only, with the result that several different blocks all map exclusively onto the same cache line. Consider for example blocks 1, 513 and 1025 which all map onto line 1 of the cache.

Reference numeral 6 denotes a four way set associative cache from which it can be seen that each block maps onto a plurality of lines in the cache. In particular blocks 1, 513 and 1025 all map onto Set 1 but there are four lines to choose from within the set where the contents of those locations at main memory could be held.

The potential difficulty with a direct-mapped cache which does not exist in a four way set associative cache can readily be seen from FIG. 1. That is, if block 1 is in the cache (at line 1) and then block 513 is to be executed, the only location in the cache suitable for accepting block 513 is line 1, which requires the eviction of block 1. If block 1 (or indeed block 513) is not often used, this is probably not too much of a problem. However, in programs where block 513 is required to be locked into the cache, then block I cannot be cached. Thus block 1 always has to be executed uncached. In order to overcome this difficulty, an executable program is generated by a linker with blocks (routines) at selected memory addresses as described in more detail in the following.

Figure 2:
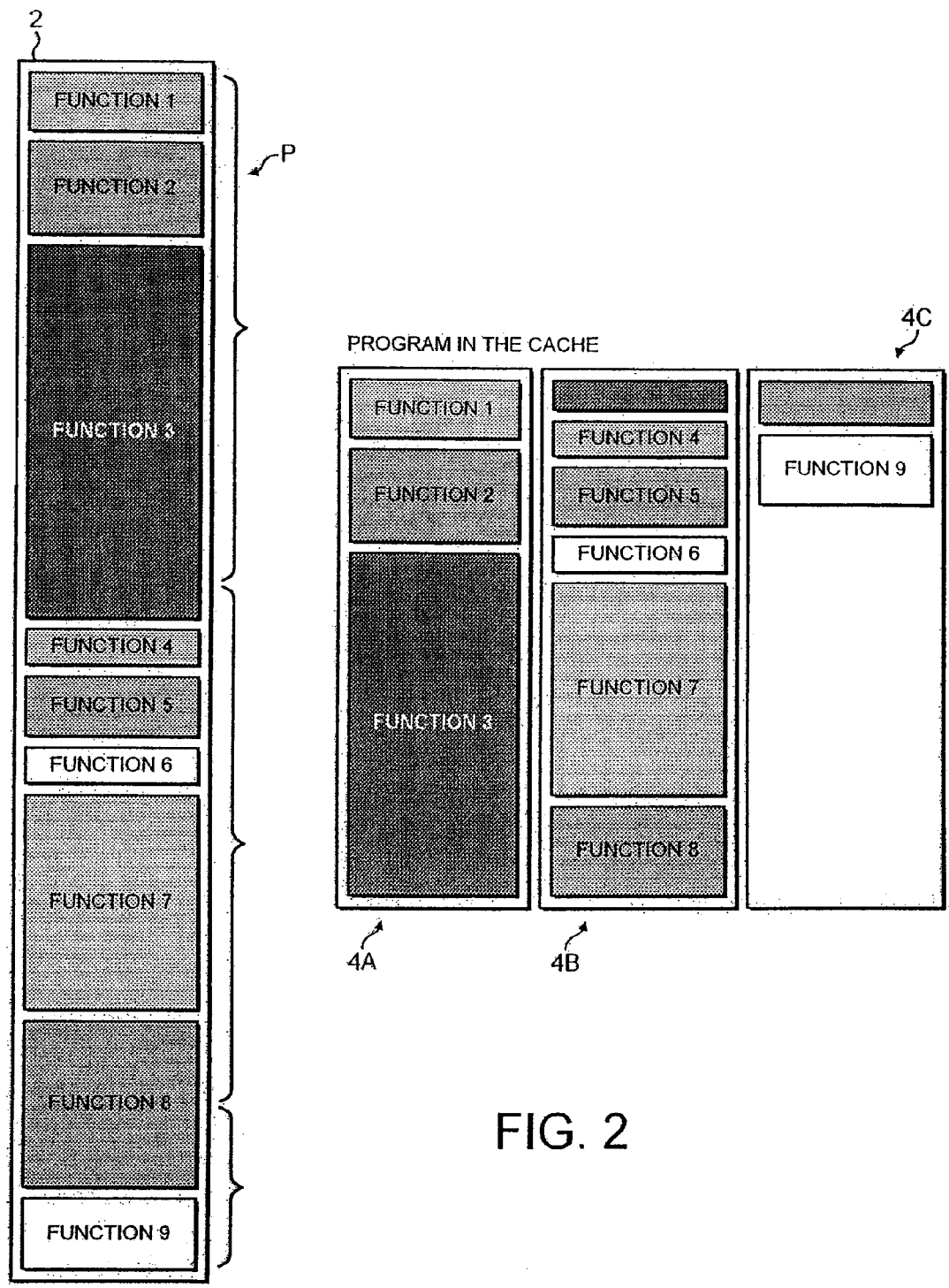
FIG. 2 is an example of a memory map.

FIG. 2 illustrates a program P comprising a plurality of functions (routines) labelled Function 1, Function 2 etc. of differing sizes held in a memory 2. The blocks labelled 4A, 4B and 40 each represent the full direct-mapped cache and illustrate the conventional mapping of the program functions in the cache From this it can be seen that for example, Function 1 maps onto the same cache lines as the end part of Function 3 and the end part of Function 8. Equivalent mappings can be seen further from the block 4A, 4B and 4C in FIG. 3.

Figure 3:
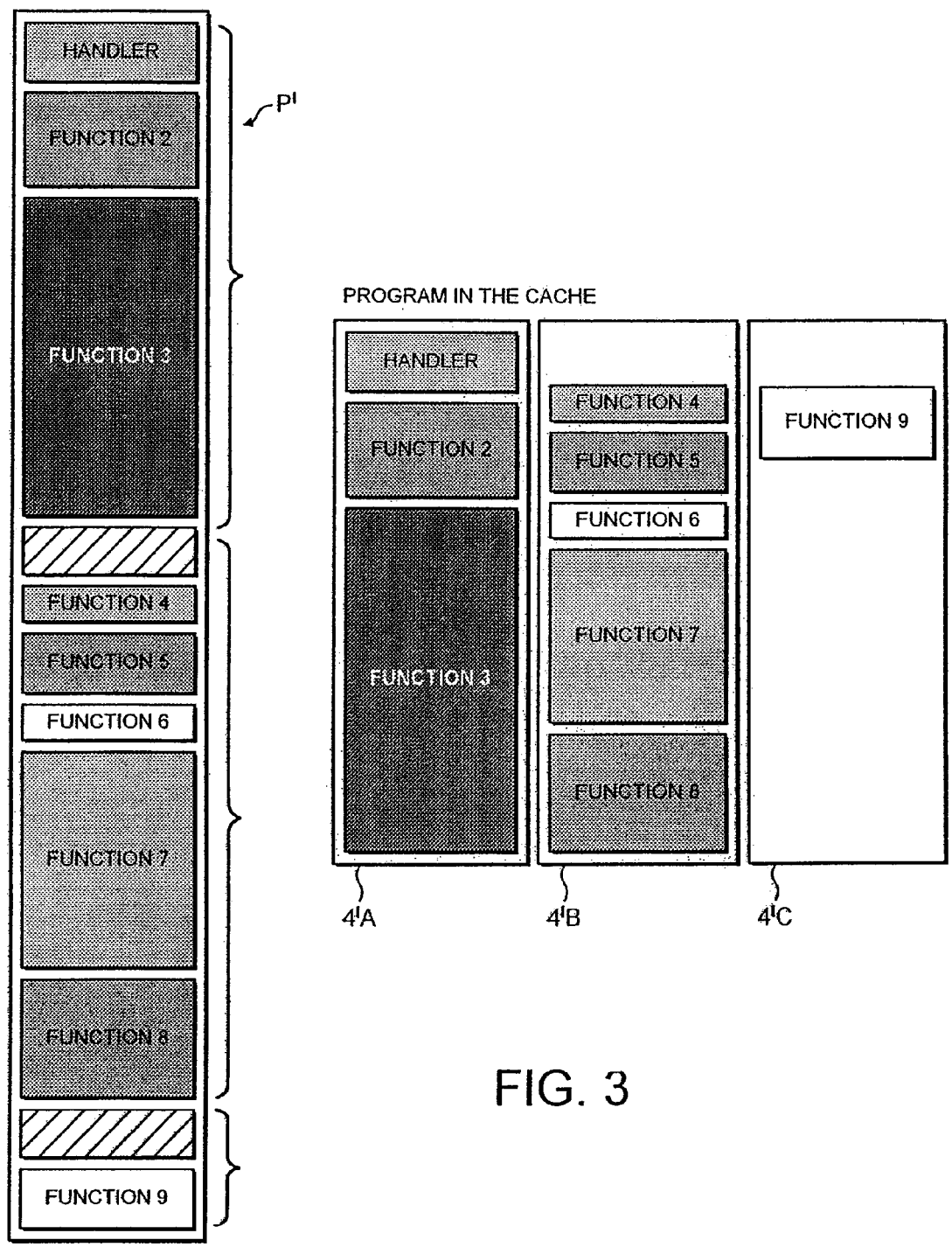
FIG. 3 is an example of a modified memory map to allow functions to be locked into the cache.
Figure 4:
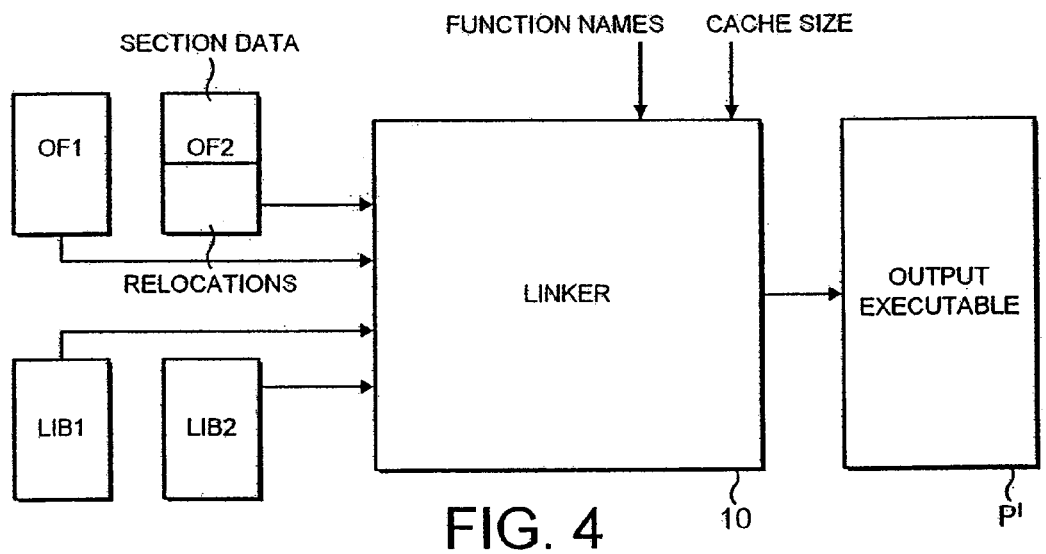
FIG. 4 is a schematic diagram illustrating the input and output to a linker.

If Function 1 is an interrupt handler routine which guarantees a maximum latency for treating an interrupt, then the program of FIG. 3 will encounter problems when executed in a processor with a direct-mapped cache. That is, whenever Function 3 is to be executed, it will replace Function 1 in the cache and therefore eject the interrupt handler routine. The next time that the interrupt handler routine is called, a cache miss will be produced and the routine will have to be fetched from main memory, thereby increasing the latency beyond the desired maximum. FIG. 4 shows how this problem is overcome. FIG. 3 illustrates a program, P' where Function 1 is labelled as "handler". The program P' has the same number of functions as the program P in FIG. 2, although for ease of explanation the size of Function 3 and the size of Function 8 as illustrated has been reduced. The important difference between the program P' illustrated in FIG. 3 and the program P of FIG. 2 is the introduction of so-called "gaps" between Function 3 and Function 4 and between Function 8 and Function 9. These gaps are shown as grey shaded areas in FIG. 3, and represent "empty" memory locations. These gaps are gaps in the sense that the object file does not contain data for these areas. The memory would still need to be allocated for these areas when the program is loaded, and in that sense the gaps would represent "empty" memory locations. Thus, the "gap" is effectively stored as a sequence of zeros. This arrangement ensures that there is no conflicting code seeking access in the cache in the same cache locations as the handler routine Function 1. This is illustrated by the mapping diagrams 4'A, 4'B and 4'C in FIG. 3. That is, the cache locations accommodating the handler routine in FIG. 4'A are empty in FIGS. 4'B and 4'C.

Figure 5:
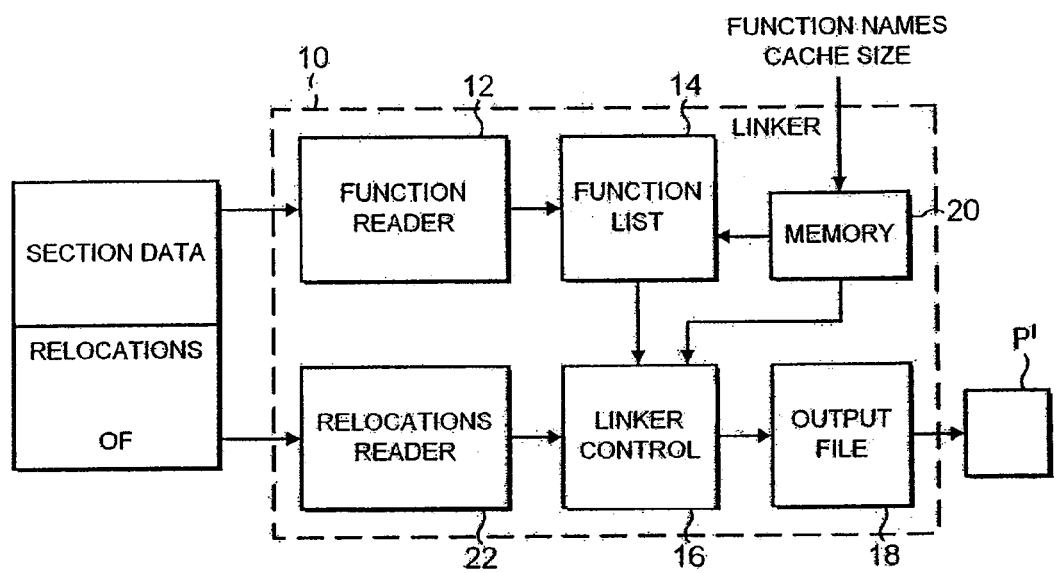
FIG. 5 is a schematic block diagram of a linker.

Reference will now be made to FIGS. 4 and 5 to explain how a linker places code within an object file in such a manner as to lock a function into a cache.

As input the linker takes a plurality of object flies, e.g. OF1, OF2 and at least one library, LIB1, LIB2 to link together with the names of any functions that should be locked into the cache. The linker also receives the size of the cache so it can control the code placement accordingly.

The input object files contain the code (section data) for each of the functions together with relocation information This information allow the linker to move the functions around and recalculate any absolute addresses. As is well known in the art, the relocation instructions (or relocations), generally list offsets into functions, for example a simple relocation may instruct the linker to add the start address of Function 4 at 32 bytes into Function 3.

The output of the linker is an executable object file representing the program P'.

FIG. 5 is a schematic diagram of a linker illustrating a number of functional blocks used to generate the output executable P'. Please note that these blocks are indicated schematically for the purposes of explanation only. In fact, they could be implemented as a combination of software or hardware in any appropriate manner. The linker comprises a function reader 12 which receives section data from an input object file OF and determines the functions. The function reader 12 creates a function list 14 which includes the size of functions and their locking status, that is whether or not they need to be locked into the cache. A memory 20 in the linker holds the function names which have a "locked" status and the size of the cache. A linker control block 16 uses the function list 14 and information from the memory 20 to place functions within a final object in an output file 18. The linker also includes a relocations reader 22 which reads the relocations of the input object file OF to allow the linker control block 16 to carry out its normal relocation function on the final object in the output file 18.

Operation of the linker will now be described.

In a first pass the linker 10 builds the list 14 of all the functions and their sizes, e.g. as given in Table 1.

TABLE 1

| Function Name | Size (Bytes) | Locking |
|---|---|---|
| Function 1 | 21430 | — |
| Handler | 480 | Locked |
| Function 2 | 12040 | — |
| Function 3 | 13170 | — |
| ... | ... | |

In a second pass the linker 10 places the functions within the final object 18. It first places each of the functions that will be locked into the object, i.e. those with a locking status "locked" in the function list. Afterwards the rest of the functions are inserted. If a function is going to clash with one of the locked functions then it is split or moved. This is determined by the linker control block 16 in conjunction with the information received from the memory 20.

In the present example, the instruction cache is 32768 bytes (32 k). The handler function is placed in the object first it uses the first 480 bytes. Next function 1 is inserted into the object, it uses bytes 480–21909. Now function 2 is inserted into the object. To ensure that the handler is locked into the cache bytes 0–479 (modulo 32768) of the object must not be used. As function 2 would use this region it is split into two parts as discussed in more detail below, and padding (gaps) is inserted between the first and second parts of Function 2. Finally function 3 is placed into the object. Our final object file layout is as given in Table 2.

TABLE 2

| Function Name | Start Address | End Address | Size |
|---|---|---|---|
| Handler | 0 | 479 | 480 |
| Function 1 | 480 | 21909 | 21430 |
| Function 2 (Part 1) | 21910 | 32767 | 10858 |
| Padding | 32768 | 33247 | 480 |
| Function 2 (Part 2) | 33248 | 34433 | 1186 |
| Function 3 | 34434 | 47603 | 13170 |

Once the functions are placed in the object file the usual relocation operation is performed.

When a function is split into parts its code is modified to ensure the control flow is maintained. The first part of the newly split function needs an additional branch inserted that will transfer control to the second part of the function. For example the following piece of code:

```
Myfunc::
    Add   r1=r2, r3;; // Offset 0
    Mul   r4=r1, r3;; // Offset 4
    Add   r4=r4, r1;; // Offset 8
    Mov   r5=myotherfunc;; // Offset 12
``` is split into two pieces as follows:

```
Myfunc::
    Add   r1=r2, r3;; // Offset 0
    Mul   r4=r1, r3;; // Offset 4
    Goto  Myfunc_part2;;
Myfunc_Part2::
    Add   r4=r4, r1;; // Offset 0
    Mov   r5=myotherfunc;; // Offset 4
```

The relocation information must be updated to take into account the split. When the function is split it is made into two smaller functions. In this example the program loads the address of Myotherfunc in the fourth instruction in the function. The relocation information states that offset 12 into myfunc should have the start address of myotherfunc replaced with its absolute address. This will be updated to say that offset 4 into myfun_part2 should have the start address of myotherfunc replaced with its absolute address.

The process of splitting the function increases its size by one instruction (goto) for each split. Sometimes it may be possible to split a function at a goto instruction and therefore not require the addition of any code.

What is claimed is:

1. A method of linking a plurality of object files to generate an executable program, the method comprising:
    identifying in the object files a routine to be locked into a cache when the program is executed;
    locating said routine at a set of memory addresses which map onto a set of cache locations; and
    introducing into the executable program a gap at another set of memory addresses which maps onto the set of cache locations.

2. A method according to claim 1, wherein the step of introducing a gap into the executable program comprises locating other routines in said object files at sets of memory addresses which do not map onto the set of cache locations.

3. A method according to claim 1, wherein the step of introducing a gap into the executable program comprises the step of splitting a routine to be located at a set of memory addresses which do not map onto the set of cache locations and which cannot be fitted into the cache otherwise.

4. A method according to claim 3, wherein the step of splitting a routine includes the step of introducing a branch instruction at an end of a first part of the routine to identify a memory address of a second part of the routine.

5. A method according to claim 1, wherein the routine is an interrupt handler routine.

6. A linker apparatus for linking a plurality of object files to generate an executable program, the linker comprising:
    means for identifying in the object files a routine to be locked into a cache when the program is executed;
    means for locating said routine at a set of memory addresses which maps onto a set of cache locations; and
    means for introducing into the executable program a gap at another set of memory addresses which maps onto the set of cache locations.

7. A linker apparatus according to claim 6, wherein the means for introducing a gap into the executable program comprises means for splitting a routine that is of too great a size to be fitted into the cache otherwise.

8. A linker apparatus according to claim 6, which comprises a store for holding names of routines to be locked into a cache.

9. A linker apparatus according to claim 6, which comprises means for creating a list of routines in the object files to be linked, said list including a locking status associated with each routine, the locking status indicating whether the routine is to be locked in the cache.

10. A computer program product comprising program code in the form of an executable program containing a plurality of routines, wherein at least one of said routines is located at a set of memory addresses which maps onto a set of cache locations and wherein another set of memory addresses which maps onto the set of cache locations the executable program contains a gap, whereby when the computer program product is loaded into a computer and executed, said at least one routine is locked into the cache.

11. The computer program product of claim 10 wherein the gap includes an empty memory address.

12. The method of claim 1 wherein the gap includes an empty memory address.

13. The method of claim 1, wherein the identifying step includes creating a list of routines in the object files, said list including a locking status associated with each routine, the locking status indicating whether the routine is to be locked in the cache.

14. The linker of claim 6 wherein the gap includes an empty memory address.

* * * * *